United States Patent [19]

August et al.

[11] Patent Number: 5,563,933
[45] Date of Patent: Oct. 8, 1996

[54] METHOD AND APPARATUS FOR FACILITATING THE COMPLETING OF TELEPHONE REGIONAL TOLL-FREE CALLS FROM OUTSIDE THE REGION

[75] Inventors: Katherine G. August, Matawan; David P. Silverman, Somerville, both of N.J.

[73] Assignee: AT&T, Holmdel, N.J.

[21] Appl. No.: 333,183

[22] Filed: Nov. 2, 1994

[51] Int. Cl.⁶ .......................... H04M 11/00; H04M 15/00; H04M 1/64; H04M 3/00
[52] U.S. Cl. ............................. 379/115; 379/67; 379/89; 379/196; 379/91
[58] Field of Search .................................... 379/112, 114, 379/115, 116, 120, 121, 127, 196, 197, 187, 188, 91, 93, 67, 88

[56] References Cited

U.S. PATENT DOCUMENTS

| | | | |
|---|---|---|---|
| 4,893,330 | 1/1990 | Franco | 379/196 X |
| 5,146,491 | 9/1992 | Silver et al. | 379/120 X |
| 5,187,710 | 2/1993 | Chau et al. | 379/127 X |
| 5,222,120 | 6/1993 | McLeod et al. | 379/196 X |
| 5,438,615 | 8/1995 | Moen | 379/114 X |
| 5,448,633 | 9/1995 | Jamaleddin et al. | 379/196 X |

Primary Examiner—Wellington Chin
Assistant Examiner—Paul Loomis
Attorney, Agent, or Firm—E. J. Rosenthal

[57] ABSTRACT

Calls to geographically limited toll-free telephone numbers, when originated from outside the predefined geographic region, are completed, but not at the called party's expense, by a) indicating to the caller that the telephone call, which otherwise will be blocked, will be completed on his behalf if the caller provides for payment of the cost of the call and b) completing the call if a signal is received from the caller indicating that the caller agrees to pay the cost of the call. Advantageously, the caller is not automatically charged for what he believed would be a free telephone call. The caller may pay for the call by charging it to any conventionally available account for charging telephone calls to which the caller is authorized to charge charges. If the account associated with the caller's telephone is selected by the caller for charging the call, a further test is made to determine if the ability to charge the cost of such geographically-limited toll-free calls to the account has been blocked. If the ability to charge the cost of such calls to the account has been blocked, the caller is offered the option of selecting a different method of payment for the call. Alternatively, the direct dial telephone number to which the 800-type telephone number translates may be announced to the caller, so that he may dial it directly himself on a subsequent call.

26 Claims, 3 Drawing Sheets

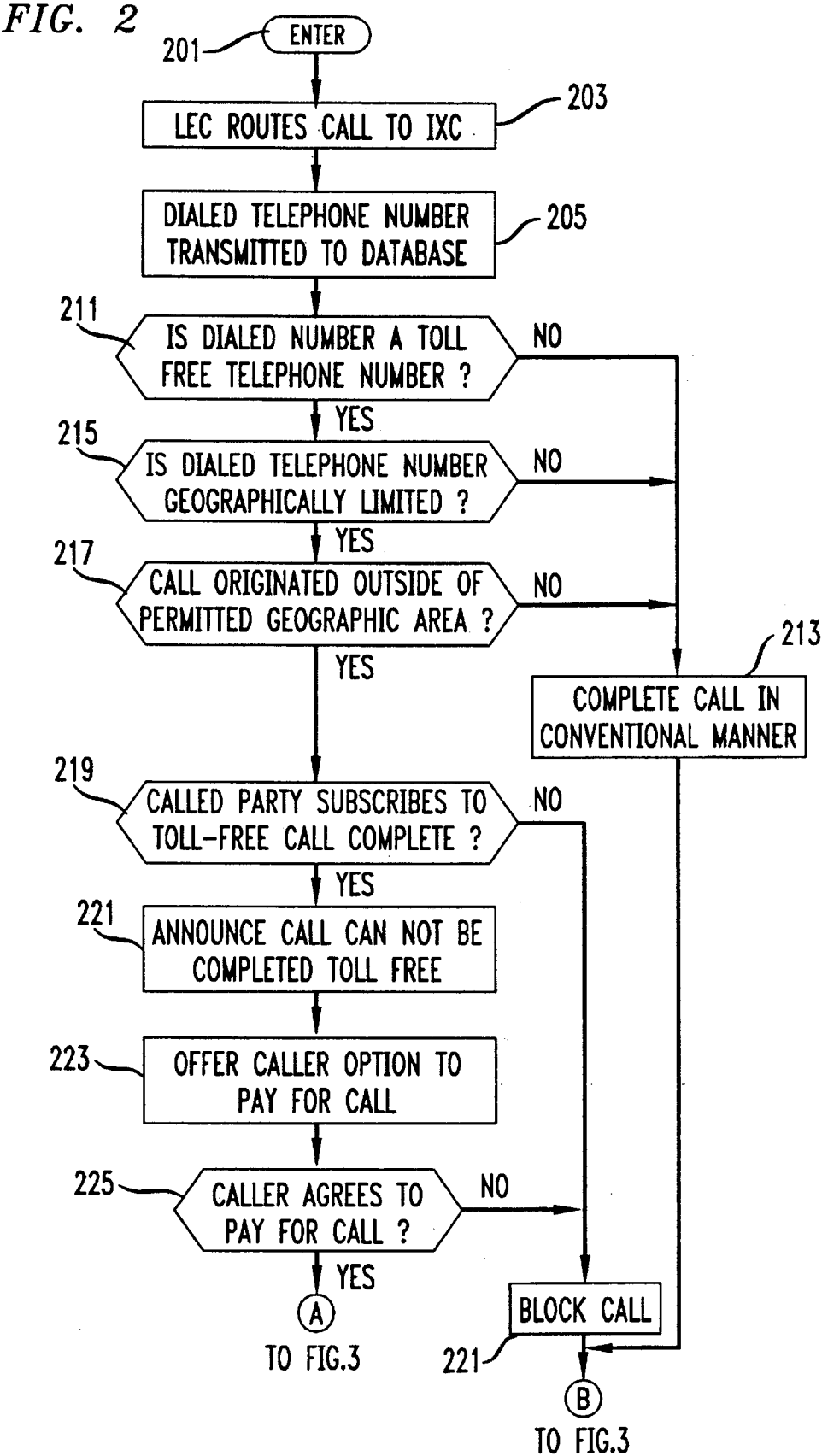

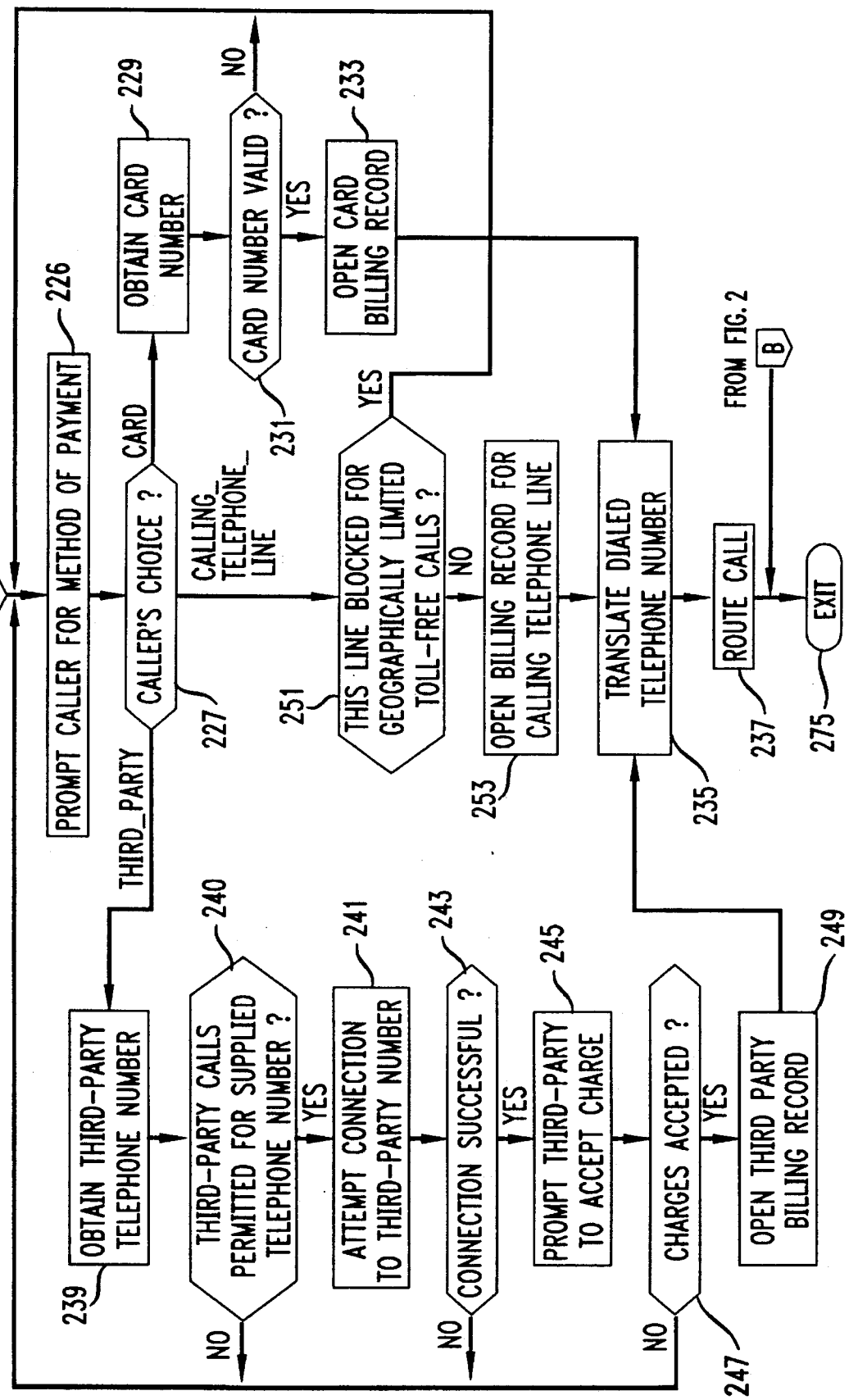

5,563,933

METHOD AND APPARATUS FOR FACILITATING THE COMPLETING OF TELEPHONE REGIONAL TOLL-FREE CALLS FROM OUTSIDE THE REGION

TECHNICAL FIELD

This invention relates to the completing of telephone calls to perceived toll-free telephone numbers.

BACKGROUND OF THE INVENTION

Certain telephone numbers, which have a particular set of commonly known characteristics, indicate that, typically, the called party will pay for the call. For example, calls to telephone numbers having particular area codes are generally known to be toll-free to the calling party, e.g., 800-type telephone numbers. Such telephone numbers are perceived from the telephone number to be toll-free to the caller and are paid for by the called party. However, often the called party is willing to accept the cost of calls to such toll-free telephone numbers only from predefined geographic regions. Calls that are not originated within the predefined geographic regions are blocked, and an announcement is played to the caller indicating that the call cannot be completed from the caller's location. Such geographic limitations, and the blocking of calls that do not originate within the predefined geographic regions, are often desired by the called party who does not, typically, do business outside of the predefined geographic region and, therefore, does not believe it to be worth the expense of accepting such calls. There may also be government regulation requiring the blocking of calls that do not originate within the predefined geographic regions.

SUMMARY OF THE INVENTION

We have recognized that many calls to toll-free telephone numbers are sales related calls. Therefore, completely blocking all calls to a geographically limited toll-free telephone number that originate from outside the predefined geographic region, as in the prior art, is undesirable, because the blocked call represents potential business for the called party. This is especially true in light of the modern trend toward ever greater mobility by people in general, and especially business people. Thus, there is a need in the art of providing an alternate method of completing a call to a geographically limited toll-free telephone number, when the telephone call originates outside of the predefined geographic region for which the called party is willing to accept the call toll-free from the called party and pay its charges.

Therefore, in accordance with the principles of the invention, a method is provided to complete geographically-limited toll-free telephone calls, such as some 800-type telephone calls, but not at the called party's expense, by a) indicating to the caller that the telephone call, which otherwise will be blocked, will be completed on his behalf if the caller provides for payment of the cost of the call and b) completing the call if a signal is received from the caller indicating that the caller agrees to pay the cost of the call. Advantageously, the caller is not automatically charged for what he believed would be a free telephone call.

In accordance with an aspect of the invention, a signal is also received from the caller indicating the particular method of payment selected by the caller. For example, the caller may pay for the call by charging it to any conventionally available account for charging telephone calls that the caller is authorized to use. Such accounts may include, a) the account associated with the caller's telephone, b) a credit or calling card, or c) a third-party telephone number supplied by the caller.

In accordance with a feature of the invention, if the account associated with the caller's telephone is selected by the caller for charging the call, a further test is made to determine if the ability to charge the cost of such geographically-limited toll-free calls to the account is available, or it has been blocked. If the ability to charge the cost of such calls to the account is available, the caller is offered the option of selecting a different method of payment for the call. Alternatively, the direct dial telephone number to which the geographically-limited toll-free telephone number translates may be announced to the caller, so that he may dial it directly himself on a subsequent call. Such a feature is especially useful for telephones, such as pay telephones and hotel room telephones, which a) permit the origination of toll-free telephone calls at no charge to the caller but b) otherwise at least pass along to the caller the charges for a call that are assessed by the telephone company to the account associated with the calling telephone. This is because such telephones would be unaware that the call has been converted from a toll-free telephone call into one that is being charged to the telephone account of the pay telephone or hotel and for which, consequently, a charge should be collected from the caller.

BRIEF DESCRIPTION OF THE DRAWING

In the drawing:

FIGS. 2 and 3, when connected together, show an exemplary process for completing calls to geographically-limited toll-free telephone numbers in accordance with the principles of the invention.

DETAILED DESCRIPTION

Figure 1:
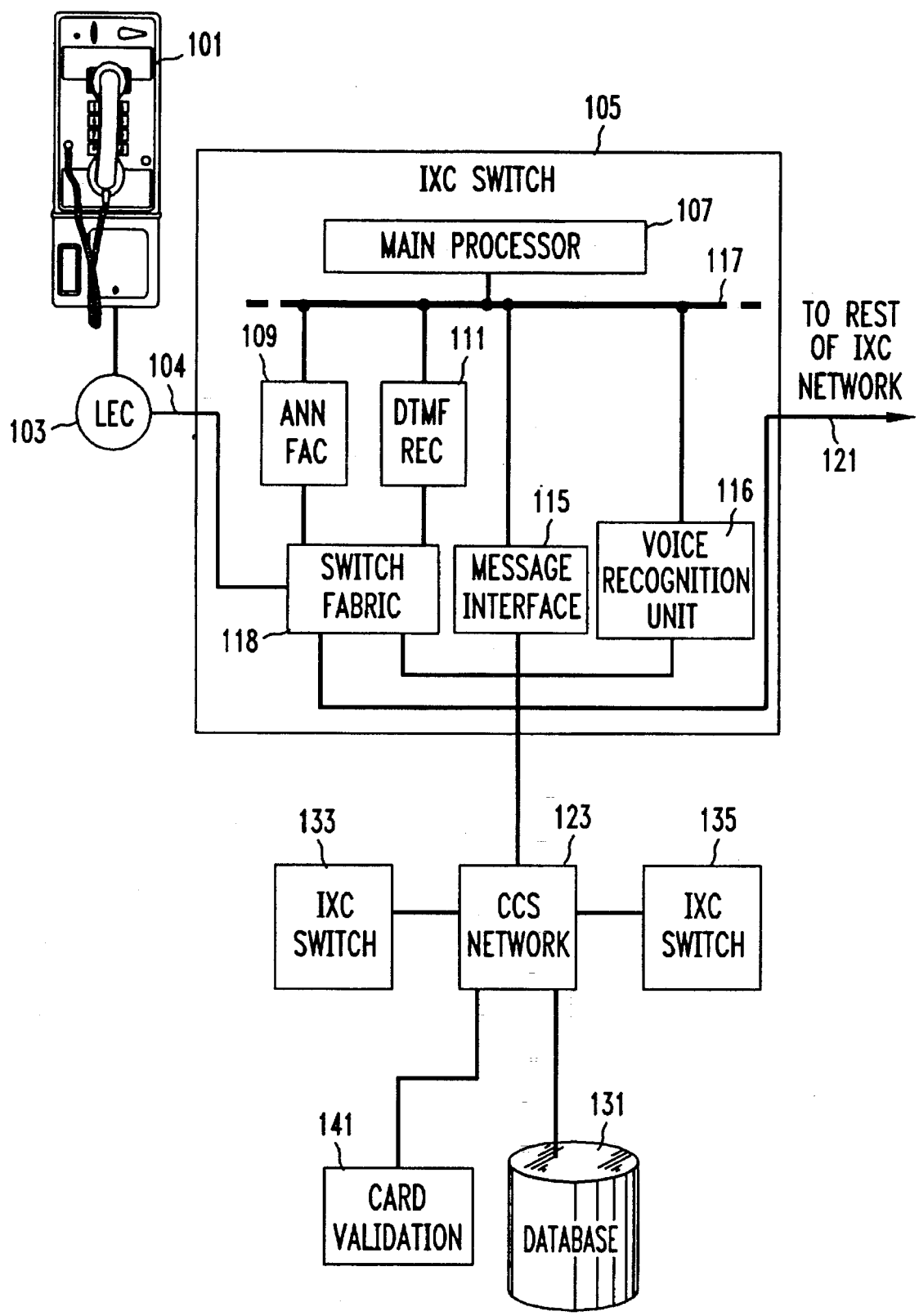
FIG. 1 shows an exemplary system for completing calls to a geographically limited toll-free telephone number that originate from outside the predefined geographic region, but not at the called party's expense, in accordance with the principles of the invention.

FIG. 1 shows an exemplary system for completing calls to a geographically limited toll-free telephone number that originate from outside the predefined geographic region, but not at the called party's expense, by a) indicating to the caller that the telephone call, which otherwise will be blocked, will be completed on his behalf if the caller provides for payment of the cost of the call and b) completing the call if a signal is received from the caller indicating that the caller agrees to pay the cost of the call in accordance with the principles of the invention. Shown are a) telephone station 101, from which calls may be originated, b) local exchange carrier (LEC) 103, c) interexchange carrier (IXC) switches 105, 133 and 135, with IXC switch 105 being shown in greater detail, d) common channel signaling (CCS) network, 123 e) data base 131 and e) card validation system 141.

IXC switch 105 includes: a) main processor 107, b) announcement facility (ANN FAC) 109, c) dual tone multifrequency receiver (DTMF REC) 111, d) message interface 115, e) bus 117, 1) switch fabric 118 and g) voice recognition unit 116. Main processor 107 controls the overall operation of IXC switch 105 by performing any necessary processing and exchanging messages with the other components of IXC switch 105 over bus 117. Announcement facility (ANN FAC) 109 can present various announcements which can be heard by the calling party. The announcements, or combinative portions thereof, are prestored in announcement facility (ANN FAC) 109. The announcements may be accessed by supplying announcement facility (ANN FAC) 109 with pointers to the announcements. Dual tone multi-frequency receiver (DTMF REC) 111 receives dual tone multi-frequency signals that are transmitted in response to the pressing of keys on the keypad of telephone station 101 and supplies the digit corresponding to each pressed key to main processor 107.

Message interface 115 is a protocol conversion unit that permits IXC switch 105 to communicate with a common channel signaling (CCS) network, such as CCS network 123. It is responsible for formatting all messages transmitted to CCS network 123 and for extracting responses received from CCS network 123. Other IXC switches, such as IXC switches 133 and 135, may also route messages via CCS network 123 to data base 131.

Switch fabric 118 can connect the trunk on which the calling party's call arrived at IXC switch 105, e.g., trunk 104, to a) announcement facility (ANN FAC) 109 b) dual tone multi-frequency receiver (DTMF REC) 111, c) voice recognition unit 116 or d) to the rest of the interexchange carrier's network, via link 121. The purposes of such connections are described further below.

By way of definition, as used herein, the term "card" refers to any type of credit card or credit account mechanism including, but not limited to: a) a telephone-company-issued card, such as the Bell Atlantic™ IQ Card, b) a combined commercial credit card and telephone card, such as the AT&T Universal Card, c) a commercial credit card, such as an American Express® card or a VISA® card, or d) a debit card. A "card call" is a telephone call whose cost is charged to the account associated with a card. Other common ways of referring to a "card call" are: a) a call charged to a card, or b) a call charged to a card number. A "card number" is a multi-character string that identifies the account associated with a card. Since it is generally the card number that is required for entering into a transaction using the account associated with a card, card issuers, i.e., the providers of the credit for each card, must provide a card holder with the card number but need not provide the card holder with a physical object that represents the card, e.g., an embossed plastic card. To successfully complete a card call, the caller may be required to supply a personal identification number (PIN) that is separate from the card number.

Card validation system 14 1 is used to validate card numbers supplied by callers for use in charging the cost of calls to their cards. Methods and apparatus that may be employed as card validation system 141 to validate card numbers are well known in the art. See for example U.S. Pat. No. 5,287,403 issued to Atkins et al. on Feb. 15, 1994.

Data base 131 is used for the routing of translatable telephone numbers, i.e., a data base lookup must be performed to determine the routing telephone number to which the call is actually completed. Some of the messages transmitted from data base 131 can trigger the actuation of functions of IXC switch 105. An exemplary such data base is the well known network control point (NCP). Table 1 is an exemplary record stored in data base 131 for use in completing calls to geographically-limited toll-free telephone numbers. Table 1 shows the association of a) the called party's telephone number, which is the translatable telephone number dialed by the calling party, b) the routing telephone number, which is the actual telephone number to which the call will be routed, c) the area codes from which the called party is willing to pay for the call, and so from which the call will be toll-free, and d) optionally, whether the called party has subscribed to the so-called "call complete" feature, by which the caller will be given the option to pay for the call if the call originates outside of the toll-free area codes.

It is noted that area codes from which the call will be toll-free may be grouped into defined sets that are listed in the record stored in data base 131, such as, in the Toll-Free Area Codes field of Table 1. In processing a call, the caller's area code, e.g., as obtained by using automatic number identification (AND, is compared against all members of any listed sets. For example, all the area codes used in the United States could be included in the definition of a set "U.S.A.". Such a set is useful for providing toll-free telephone calls only to callers located within the United States, but not those in Canada. Other exemplary sets could be Eastern United States, Northeast, Western United States, etc. Those skilled in the art will understand how to construct the sets for those regions their subscribers desire. The label "ALL" indicates that calls from any area code are handled toll-free.

TABLE 1

| Data Base Record | | | |
|---|---|---|---|
| 800 Number | Actual Address | Toll-Free Area Codes | Call Complete Activated |
| 800-555-6167 | 555-631-6167 | 212,201,908 | YES |
| 800-555-1212 | 201-555-1111 | 212, 617 | NO |
| 800-555-3179 | 908-555-2352 | ALL | N/A |
| 800-555-1234 | 212-555-2070 | U.S.A. | YES |

Given the description above, IXC switch 105 and data base 131 can be designed by those skilled in the art.

FIGS. 2 and 3, when connected together, show an exemplary process for completing calls to geographically-limited toll-free telephone numbers in accordance with the principles of the invention. The process is entered in step 201 when the caller at telephone station 101 places a call. In step 203, LEC 103 recognizes from the particular toll-free, e.g., 800-type, telephone number dialed by the caller that the call is to be carried by a particular IXC and, therefore, it forwards the call to IXC switch 105 of that IXC. In step 205, IXC switch 105 recognizes that an 800-type number was dialed and that it must be forwarded to and processed by data base 13 1. Therefore, IXC switch 105 transmits a message containing the dialed number to data base 131. The message is sent via message interface 115 and CCS network 123.

In conditional branch point 211, data base 13 1 tests to determine if the dialed telephone number is a toll-free telephone number. If the test result in step 211 is NO, control passes to step 213 and the call is completed in the conventional manner. The process then exits in step 275.

If the test result in step 211 is YES, control passes to conditional branch point 215, in which data base 131 tests to determine if the dialed telephone number is geographically limited. If the test result in step 215 is NO, control passes to step 213 and the call is completed in the conventional manner, i.e., the call is charged to the called party. The process then exits in step 275.

If the test result in step 215 is YES, control passes to conditional branch point 217, in which data base 131 tests to determine if the call originated from outside of the permitted geographic area for the call to be toll-free. If the test result in step 217 is NO, control passes to step 213 and the call is completed in the conventional manner, i.e., the call is charged to the called party. The process then exits in step 275.

If the test result in step 2 17 is YES, control passes to optional step 219, which tests to determine if the called party has subscribed to the so-called "toll-free call complete" feature of the present invention. If the test result in step 219 is NO, control passes to step 221, and the call is blocked in the conventional manner. The process then exits in step 275.

If the test result in step 219 is YES, or after execution of step 217 if optional step 219 is not implemented, control passes to step 221, in which an announcement is made to the caller indicating that the call cannot be completed toll-free, because the caller is outside of the geographic region for toll-free call treatment. Next, in step 223, in accordance with the principles of the invention, the caller is 1) offered the option of paying to have the call completed on his behalf and 2) requested to signal if he so desires. For example, the caller may be instructed to press the "1" key on the telephone keypad if he desires to have the call completed on his behalf and he agrees to pay to do so, or to press the "2" key, or hang up, if he does not so desire. Conditional branch point 225 tests to determine the caller's response. If the test result in step 225 is NO, indicating the caller does not desire to pay to have the call completed, control passes to step 221, and the call is blocked in the conventional manner. The process then exits in step 275.

If the test result in step 225 is YES, indicating the caller desires to have the call completed and agrees to pay the charges therefor, control passes to step 226, which requests that the caller signal an indication of his method of payment, e.g., by pressing the key on telephone station 101 corresponding to an announced available method of payment, in accordance with an aspect of the invention. For example, the caller may charge the call to any conventionally available account for charging telephone calls to which the caller is authorized to charge charges, such as, the account associated with the caller's telephone, a credit or calling card, or a third-party telephone number supplied by the caller. Conditional branch point 227 determines the caller's choice of accounts.

If the test result in step 227 is "CARD", control passes to step 229, in which a card number is obtained from the caller, e.g., by having the caller generate dual tone multi-frequency (DTMF) signals corresponding to the digits of the card number by pressing keys on the keypad of telephone station 101. The digits corresponding to the DTMF signals are 1) determined by DTMF receivers (REC) 111 and 2) conveyed to data base 131 via main processor 107, message interface 115, and CCS network 123. Conditional branch point 131 tests to determine if the received card number is valid. This is done by launching a validation query to card validation 141 and receiving a response therefrom. If the test result in step 231 is NO, indicating that the card is invalid, control is passed back to step 226 to give the caller an opportunity to provide an alternate method of payment or to supply a different card number. Alternatively, control may be passed to step 221, and the call is blocked.

If the test result in step 231 is YES, indicating that the card is valid, control passes to step 233, in which a card billing record is opened for billing the call, in accordance with the principles of the invention. Thereafter, in step 235, data base 131 translates the dialed telephone number into a routing telephone number and supplies the routing telephone number to IXC switch 105. Next, in step 237, IXC switch 105 completes the call by routing it to the routing telephone number. The process then exits in step 275.

If the test result in step 227 is "THIRD_PARTY", control passes to step 239, in which a third-party telephone number is obtained from the caller, e.g., by having the caller generate dual tone multi-frequency (DTMF) signals corresponding to the digits of the third-party number by pressing keys on the keypad of telephone station 101. The digits corresponding to the DTMF signals are determined by DTMF receivers (REC) 111 and conveyed to data base 131 via main processor 107, message interface 115, and CCS network 123.

Optionally, conditional branch 240, tests to determine if third-party calls may be charged to the supplied third-party telephone number. If the test result in step 240 is NO, control passes back to step 226, to give the caller the opportunity to provide an alternate third-party telephone number or an alternate method of payment. This step is useful, for example, to prevent third-party calls from being charged to pay telephones.

If the test result in step 240 is YES, control passes to step 241, in which IXC 105 attempts to be establish a connection to the caller supplied third-party telephone number. The purpose of this connection is to obtain authorization for charging the call to the third-party telephone number. Conditional branch point 243 tests to determine if the connection is successfully established. If the test result in step 243 is NO, control passes back to step 226, to give the caller the opportunity to provide an alternate method of payment.

If the test result in step 243 is YES, control passes to step 245, which asks the third party who answers the call if the charges for the charges for the call will be accepted and prompts the third party to signal his response. Conditional branch point 247 tests to determine the third party's response. If the test result in step 247 is NO, control passes back to step 226, to give the caller the opportunity to provide an alternate third-party telephone number or an alternate method of payment.

If the test result in step 247 is YES, indicating that the third party accepts the charges, control passes to step 249, in which a third-party billing record is opened for billing the call, in accordance with the principles of the invention. Thereafter, control passes to step 235, in which data base 131 translates the dialed telephone number into a routing telephone number and supplies the routing telephone number to IXC switch 105. Next, in step 237, IXC switch 105 completes the call by routing it to the routing telephone number. The process then exits in step 275.

If the test result in step 227 is "CALLING_TELEPHONE_LINE", control passes to optional conditional branch point 251, which tests to determine if the ability to charge the cost of such geographically-limited toll-free calls to the account associated with the calling telephone line has been blocked. If the test result in step 251 is NO, control passes to step 253, in which a billing record for charging a call to the calling telephone line is opened for billing the call, in accordance with the principles of the invention. Thereafter, control passes to step 235, in which data base 131 translates the dialed telephone number into a routing telephone number and supplies the routing telephone number to IXC switch 105. Next, in step 237, IXC switch 105 completes the call by routing it to the routing telephone number. The process then exits in step 275.

If the test result in step 251 is YES, indicating that the ability to charge the cost of such calls to the account has been blocked, control passes back to step 226, to give the caller the opportunity to provide an alternate method of payment for the call. The blocking of charges for such calls is especially useful for telephones such as pay telephones and hotel room telephones which permit the origination of toll-free telephone calls at no charge. This is because such telephones would be unaware that the call has been converted from a toll-free telephone call into that is being charged to the telephone account of the pay telephone or hotel and for which, consequently, a charge should be collected from the caller.

Alternatively, in another embodiment of the invention, if the test result in step 251 is YES, indicating that the ability to charge the cost of such calls to the account has been blocked, instead of control passing to step 226, control passes to an alternative step in which, in accordance with a feature of the invention, the direct dial telephone number to which the 800-type telephone number translates is announced to the caller, so that he may dial it directly himself on a subsequent call. The process then exits in step 275.

In another embodiment of the invention, step 226 is modified so that the caller is only offered a choice of methods of payment that he has not already attempted to use.

In accordance with a feature of the invention, the cost of the call, or at least the cost of an initial time period of the call, is announced to the caller so that he may determine if he wishes to accept the cost of the call. Such an announcement is useful since the caller, who dialed a translatable telephone number, does not know the actual routing number of the call, and thus he cannot determine, even approximately, the cost of the call.

Voice recognition unit 116, may be invoked for use in receiving information from the caller or a third party instead of dual tone multi-frequency receiver (DTMF REC) 111.

It is noted that the functionality of the heretofore described invention may be divided between IXC switch 105 and data base 131 according to the desire of the implementer. Other implementations of the invention may also utilize an additional adjunct interfaced to IXC switch 105 and data base 131 to divide up the processing burden. Such implementations will be readily apparent to those of ordinary skill in the art.

It is noted that methods other than area codes may be used to define geographic regions. For example, since area codes are often served by one or more telephone exchanges, or offices, finer geographic resolution may be obtained by defining geographic regions on an exchange-by-exchange basis.

The foregoing merely illustrates the principles of the invention. It will thus be appreciated that those skilled in the art will be able to devise various arrangements which, although not explicitly described or shown herein, embody the principles of the invention and are thus within its spirit and scope.

We claim:

1. A method for use in completing a caller's telephone call that is placed to a telephone number that is toll-free to callers that originate calls to said telephone number from predefined geographic areas, said caller's telephone call originating from a geographic area outside of said predefined geographic areas, the method comprising the steps of:

recognizing that the caller's telephone call originates outside of the predefined geographic areas;

indicating to said caller that payment of the charges for said telephone call must be undertaken by said caller or said telephone call will be blocked; and completing said telephone call only if a signal is received from said caller indicating that caller agrees to be responsible for payment of the cost of said telephone call.

2. The invention as defined in claim 1 further including the step of blocking said call only if a negative response is received from said caller.

3. The invention as defined in claim 1 wherein said telephone number is a translatable telephone number and said step of completing further includes the steps of:

translating said translatable telephone number into a routing telephone number; and routing said telephone call to the destination specified by said routing telephone number.

4. The invention as defined in claim 1 further including the step of indicating to said caller the charges for said call prior to said step of completing.

5. The invention as defined in claim 1 further including the step of:

receiving from said caller an indication specifying an account for billing the cost of said telephone call.

6. The invention as defined in claim 5 wherein said account is associated with the telephone line from which said caller originated said telephone call.

7. The invention as defined in claim 6 further including the step of determining if calls that are placed to geographically limited toll-free telephone numbers are authorized to be charged to said account associated with said calling telephone.

8. The invention as defined in claim 7 further including the step of signaling said user to provide an alternate method of payment only if said account is not so authorized.

9. The invention as defined in claim 7 further including the step of announcing to said caller the translated telephone number for said telephone number to which said call was placed only if said account is not so authorized.

10. The invention as defined in claim 7 further including the step of blocking said call only if said account is not so authorized.

11. The invention as defined in claim 5 wherein said account is a card account.

12. The invention as defined in claim 5 wherein said account is a card account, said method further including the steps of:

receiving a card number from said caller; and validating said received card number;

wherein said completing step is performed only if said card number is valid.

13. The invention as defined in claim 5 wherein said account is associated with a third-party telephone number.

14. The invention as defined in claim 5 wherein said account is associated with a third-party telephone number, said method further including the steps of:

requesting authorization from said third party to charge said call to said account; and receiving a response to said request;

wherein said completing step is performed only if said response is affirmative.

15. A method for use in completing a caller's telephone call that is placed to a telephone number that is toll-free to callers that originate calls to said telephone number from predefined geographic areas, said caller's telephone call originating from a geographic area outside of said predefined geographic areas, the method comprising the steps of:

recognizing that the caller's telephone call originates outside of the predefined geographic areas;

announcing to said caller that said telephone call will be blocked unless said caller agrees to pay for said telephone call;

completing said telephone call only if a signal is received from said caller indicating that said caller agrees to pay for said telephone call; and charging the cost of said telephone call to an account specified by said caller.

16. The invention as defined in claim 15 further including the step of blocking said call only if a negative response is received from said caller.

17. The invention as defined in claim 15 further including the step of receiving from said caller a card number to which the cost of said telephone call is charged.

18. The invention as defined in claim 15 further including the step of receiving from said caller an indication to charge the cost of said telephone call to an account associated with said calling telephone.

19. The invention as defined in claim 18 further including the steps of:

determining if calls that are placed to geographically limited toll-free telephone numbers are authorized to be charged to said account associated with said calling telephone; and signaling said user to provide an alternate method of payment only if said account is not so authorized.

20. The invention as defined in claim 18 wherein said telephone number is a translatable telephone number, the invention further including the steps of:

determining if calls that are placed to geographically limited toll-free telephone numbers are authorized to be charged to said account associated with said calling telephone; and announcing to said caller the routing telephone number for said translatable telephone number to which said call was placed only if said account is not so authorized.

21. The invention as defined in claim 18 further including the steps of:

determining if calls that are placed to geographically limited toll-free telephone numbers are authorized to be charged to said account associated with said calling telephone; and blocking said call only if said account is not so authorized.

22. The invention as defined in claim 21 further including the step of announcing to said caller that said call cannot be completed.

23. A method for use in completing a caller's telephone call that is placed to a telephone number that is toll-free to callers that originate calls to said telephone number from predefined telephone exchanges, said caller's telephone call originating from a telephone exchange outside of said predefined telephone exchanges, the method comprising the steps of:

recognizing that the caller's telephone call originates outside of the predefined telephone exchanges;

announcing to said caller that said telephone call will be blocked unless said caller agrees to pay for said telephone call;

completing said telephone call and charging the cost of said telephone call to an account specified by said caller only if a signal is received from said caller indicating that said caller agrees to pay for said telephone call; and blocking said telephone call only if said signal is not received.

24. The invention as defined in 23 wherein, in said announcing step, an indication of the cost of at least a portion of said telephone call is announced to said caller.

25. The invention as defined in 23 further including the step of receiving from said caller an indication to charge the cost of said telephone call to an account associated with said calling telephone.

26. The invention as defined in claim 25 further including the steps of:

determining if the account associated with the calling telephone is authorized to be used for the charging of telephone calls that are placed to toll-free telephone numbers from outside of the predefined telephone exchanges for which said telephone calls are completed toll-free; and signaling said user to provide an alternate method of payment only if the result of said determining step is that said account is not so authorized.

* * * * *